(12) United States Patent
Torii et al.

(10) Patent No.: US 8,527,439 B2
(45) Date of Patent: Sep. 3, 2013

(54) PATTERN IDENTIFICATION METHOD, PARAMETER LEARNING METHOD AND APPARATUS

(75) Inventors: Kan Torii, Pittsburgh, PA (US); Katsuhiko Mori, Kawasaki (JP); Yusuke Mitarai, Tokyo (JP); Hiroshi Sato, Kawasaki (JP); Yuji Kaneda, Kawasaki (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 991 days.

(21) Appl. No.: 12/205,174

(22) Filed: Sep. 5, 2008

(65) Prior Publication Data

US 2009/0089235 A1   Apr. 2, 2009

(30) Foreign Application Priority Data

Sep. 27, 2007   (JP) ................... 2007-252375

(51) Int. Cl.
   *G06F 17/00* (2006.01)
(52) U.S. Cl.
   USPC .......................................... 706/45; 382/155
(58) Field of Classification Search
   USPC .......................................... 706/45; 382/155
   See application file for complete search history.

(56) References Cited

U.S. PATENT DOCUMENTS

| | | | |
|---|---|---|---|
| 5,760,346 A | 6/1998 | Kobayashi et al. | |
| 5,761,087 A | 6/1998 | Yoshimura et al. | |
| 5,862,049 A | 1/1999 | Sato et al. | |
| 6,225,986 B1 | 5/2001 | Sato et al. | |
| 6,239,792 B1 | 5/2001 | Yanagisawa et al. | |
| 6,288,711 B1 | 9/2001 | Tanaka et al. | |
| 6,611,258 B1 | 8/2003 | Tanaka et al. | |
| 7,039,233 B2 | 5/2006 | Mori et al. | |
| 2006/0074653 A1 | 4/2006 | Mitari et al. | |
| 2006/0112038 A1* | 5/2006 | Luo ................................ | 706/20 |
| 2006/0115157 A1 | 6/2006 | Mori et al. | |
| 2006/0204053 A1 | 9/2006 | Mori et al. | |
| 2006/0228005 A1 | 10/2006 | Matsugu et al. | |
| 2007/0242856 A1 | 10/2007 | Suzuki et al. | |
| 2008/0219516 A1 | 9/2008 | Suzuki et al. | |

OTHER PUBLICATIONS

Mori et al ("Face Recognition Using SVM Fed with Intermediate Output of CNN for Face Detection." 2005).*
Viola et al ("Robust Real-time Object Detection" 2001).*
Chien et al ("Discriminant Waveletfaces and Nearest Feature Classifiers for Face Recognition" 2002).*
Lienhart et al ("A Detector Tree of Boosted Classifiers for Real-Time Object Detection and Tracking" 2003).*
Viola, et al., "Rapid Object Detection using a Boosted Cascade of Simple Features", Computer Vision and Pattern Identification, 2001.
Huang, et al., "Vector Boosting for Rotation Invariant Multi-View Face Detection", International Conference on Computer Vision, 2005.

* cited by examiner

*Primary Examiner* — Lut Wong
(74) *Attorney, Agent, or Firm* — Fitzpatrick, Cella, Harper & Scinto

(57) ABSTRACT

In a pattern identification method in which input data is classified into predetermined classes by sequentially executing a combination of a plurality of classification processes, at least one of the classification processes includes a mapping step of mapping the input data in an N ($N \geq 2$) dimensional feature space as corresponding points, a determination step of determining whether or not to execute the next classification process based on the corresponding points, and selecting step of selecting a classification process to be executed next based on the corresponding points when it is determined in the determination step that the next classification process should be executed.

7 Claims, 14 Drawing Sheets

FIG. 5

| NODE TYPE (T2) | |
|---|---|
| RECTANGULAR INFORMATION | NUMBER OF RECTANGLES n |
| | COORDINATES FOR RECTANGULAR 1 $(x_{1L}, y_{1T}) - (x_{1R}, y_{1B})$ |
| | COORDINATES FOR RECTANGULAR 2 $(x_{2L}, y_{2T}) - (x_{2R}, y_{2B})$ |
| | ... |
| | COORDINATES FOR RECTANGULAR n $(x_{nL}, y_{nT}) - (x_{nR}, y_{nB})$ |
| CENSORING PARAMETER | THRESHOLD VALUE $\theta$ |
| | COEFFICIENT OF RECTANGULAR 1 $a_1$ |
| | COEFFICIENT OF RECTANGULAR 2 $a_2$ |
| | ... |
| | COEFFICIENT OF RECTANGULAR n $a_n$ |
| | NUMBER OF BRANCH TARGETS m |
| PARAMETER FOR BRANCH TARGET A | THRESHOLD VALUE $\theta_A$ |
| | COEFFICIENT OF RECTANGULAR 1 $a_{A1}$ |
| | COEFFICIENT OF RECTANGULAR 2 $a_{A2}$ |
| | ... |
| | COEFFICIENT OF RECTANGULAR n $a_{An}$ |
| | POINTER LEADING TO BRANCH TARGET NODE A |
| PARAMETER FOR BRANCH TARGET B | THRESHOLD VALUE $\theta_B$ |
| | COEFFICIENT OF RECTANGULAR 1 $a_{B1}$ |
| | COEFFICIENT OF RECTANGULAR 2 $a_{B2}$ |
| | ... |
| | COEFFICIENT OF RECTANGULAR n $a_{Bn}$ |
| | POINTER LEADING TO BRANCH TARGET NODE B |
| ... | ... |
| POINTER LEADING TO LAST BRANCH TARGET NODE | |

F I G. 12
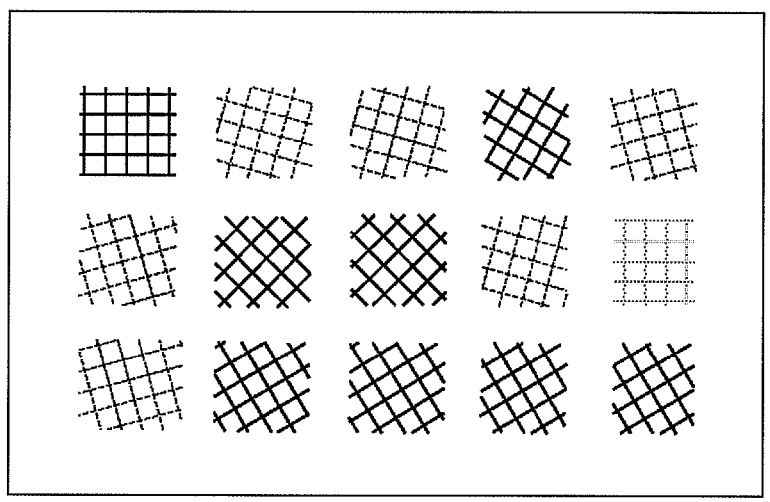

PATTERN IDENTIFICATION METHOD, PARAMETER LEARNING METHOD AND APPARATUS

BACKGROUND OF THE INVENTION

1. Field of the Invention

The present invention relates to a parameter learning method for identifying a pattern of an input signal, such as image recognition, and a pattern identification method using the same.

2. Description of the Related Art

Many techniques have heretofore been conceived as a pattern identification method for classifying input data into predetermined classes, such as character recognition, face detection and gait authentication, and various new techniques are still being proposed with the goal of increasing the processing speed and improving the classification accuracy. For example, Viola & Jones (2001) "Rapid Object Detection using a Boosted Cascade of Simple Features", Computer Vision and Pattern identification (hereinafter Document 1) proposes to achieve a high-speed and highly accurate pattern identification method by combining a learning method based on AdaBoost and a technique for cascade-connecting weak classifiers using a weak classifying method, which can perform computation in a short time.

Another method has also been proposed in which weak classifiers are connected in a tree structure to achieve classification into three or more classes. For example, according to Huang, Ai, Li & Lao (2005) "Vector Boosting for Rotation Invariant Multi-View Face Detection", International Conference on Computer Vision (hereinafter, Document 2), face images to which orientation and inclination are labeled are learned, a face in a test image is detected, and its direction and inclination are determined.

As described above, techniques for performing high-speed and highly accurate pattern identification on an input image have been proposed. For example, it is required to identify the presence or absence of a face in an input image, or the presence or absence of a specific pattern (texture) with high speed and high accuracy so as to finely capture an image of a human face with an imaging apparatus or to correct a face image. However, conventional techniques as described above are not satisfactory.

SUMMARY OF THE INVENTION

The present invention has been conceived in light of the foregoing, and it is an object of the present invention to achieve a pattern identification process for identifying input data that belongs to either of two classes with high speed and high accuracy.

According to one aspect of the present invention, a pattern identification method for classifying input data into a first class or a second class by sequentially executing a combination of a plurality of classification processes, wherein at least one of the plurality of classification processes comprises:

a mapping step of mapping the input data in an n-dimensional feature space as corresponding points, where n is an integer equal to or greater than 2;

a determination step of determining whether the input data belongs to the first class or the next classification process should be executed based on the location of the corresponding points mapped in the mapping step in the n-dimensional feature space; and a selecting step of selecting a classification process that should be executed next based on the location of the corresponding points when it is determined in the determination step that the next classification process should be executed.

According to another aspect of the present invention, a parameter learning method for learning a parameter for pattern identification that classifies input data into a first class or a second class, the method comprises:

an input step of inputting a plurality of learning data items labeled as the first or second class;

a mapping step of mapping the learning data items in an n-dimensional feature space as corresponding points, where n is an integer equal to or greater than 1; and a learning step of learning a pattern identification parameter that divides the n-dimensional feature space into feature spaces each of which is occupied with the corresponding points labeled as the same class.

According to still another aspect of the present invention, a parameter learning method for pattern identification that classifies input data into a first class or a second class, the method comprises:

an input step of inputting a plurality of learning data items labeled as the first or second class;

a first mapping step of provisionally mapping a plurality of learning data items labeled as the first class in an $N_r$-dimensional feature space as corresponding points, where $N_r$ is an integer equal to or greater than 1;

a first learning step of learning a provisional parameter for dividing the $N_r$-dimensional feature space based on a distribution of the corresponding points mapped in the first mapping step in the $N_r$-dimensional feature space;

a determination step of determining an n-dimensional feature space to be used for identification based on the provisional parameter;

a second mapping step of mapping learning data items labeled as the second class in the n-dimensional feature space as corresponding points; and a second learning step of learning a parameter for dividing the n-dimensional feature space based on a distribution of the corresponding points mapped in the second mapping step.

According to still yet another aspect of the present invention, a pattern identification apparatus that classifies input data into a first class or a second class by sequentially executing a combination of a plurality of classification processes, wherein at least one of the plurality of classification processes comprises:

a mapping means for mapping the input data in an n-dimensional feature space as corresponding points, where n is an integer equal to or greater than 2;

a determination means for determining whether the input data belongs to the first class or the next classification process should be executed based on a distribution of the corresponding points mapped by the mapping means in the n-dimensional feature space; and a selecting means for selecting a classification process to be executed next based on the distribution of the corresponding points when it is determined by the determination means that the next classification process should be executed.

According to yet still another aspect of the present invention, a parameter learning apparatus that learns a parameter for pattern identification that classifies input data into a first class or a second class, the apparatus comprises:

an input means for inputting a plurality of learning data items labeled as the first or second class;

a mapping means for mapping the learning data items in an n-dimensional feature space as corresponding points, where n is an integer equal to or greater than 1; and a learning means for learning a pattern identification parameter that divides the n-dimensional feature space into feature spaces each of which is occupied with corresponding points labeled as the same class.

According to still yet another aspect of the present invention, a parameter learning apparatus that learns a parameter for pattern identification that classifies input data into a first class or a second class, the apparatus comprises:

an input means for inputting a plurality of learning data items labeled as the first or second class;

a first mapping means for provisionally mapping a plurality of learning data items labeled as the first class in an $N_r$-dimensional feature space as corresponding points, where $N_r$ is an integer equal to or greater than 1;

a first learning means for learning a provisional parameter for dividing the $N_r$-dimensional feature space based on a distribution of the corresponding points mapped by the first mapping means in the $N_r$-dimensional feature space;

a determination means for determining an n-dimensional feature space to be used for identification based on the provisional parameter;

a second mapping means for mapping learning data items labeled as the second class in the n-dimensional feature space as corresponding points; and a second learning means for learning a parameter for dividing the n-dimensional feature space based on a distribution of the corresponding points mapped by the second mapping means.

Further features of the present invention will become apparent from the following description of exemplary embodiments with reference to the attached drawings.

BRIEF DESCRIPTION OF THE DRAWINGS

FIG. 5 is a diagram illustrating a data structure of Type-T2 node.

FIG. 12 is a diagram illustrating an example of an image used in learning according to Embodiment 2.

DESCRIPTION OF THE EMBODIMENTS

Exemplary embodiments of the present invention will now be described in detail in accordance with the accompanying drawings.

Embodiment 1

Embodiment 1 illustrates an example of an information processing apparatus that determines whether or not an input image includes a face. In order to simplify the description of the present embodiment, it is assumed that, if a face is included in inputted images, the face has a predetermined size and is arranged at a substantially center position, as in passport photographs. It is, of course, possible to detect a face of any size that is located at any position by scanning or enlarging/reducing an image.

Figure 1:
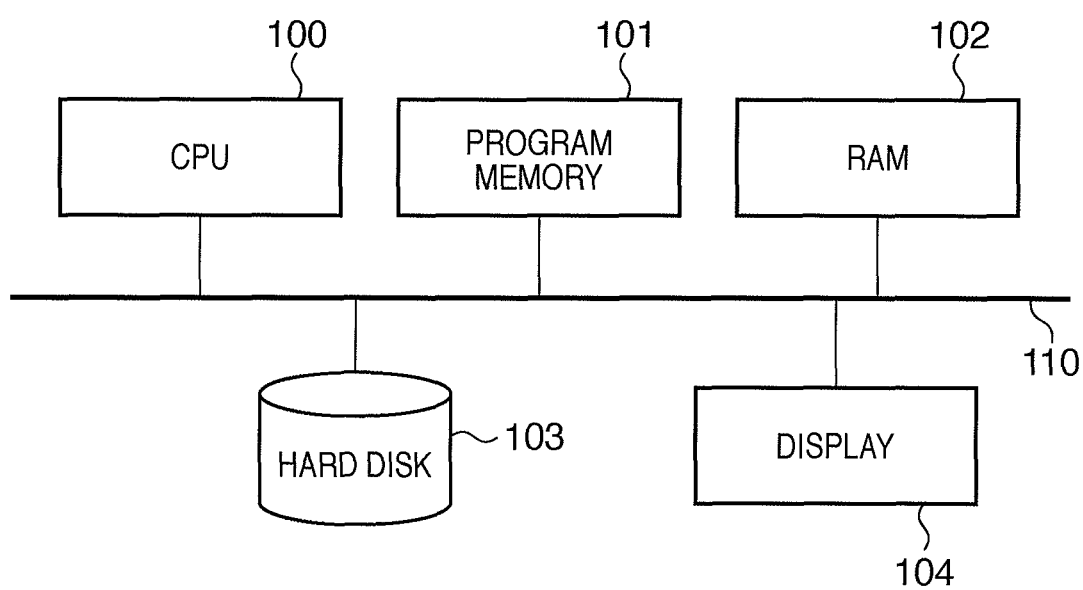
FIG. 1 is a block diagram used to illustrate an example of the hardware configuration of an information processing apparatus according to Embodiment 1.

FIG. 1 is a block diagram used to illustrate an example of the hardware configuration of an information processing apparatus according to Embodiment 1. In FIG. 1, reference numeral 100 denotes a CPU (central processing unit), which executes an information processing method described in the present embodiment in accordance with a program. Reference numeral 101 denotes a program memory, which stores programs that are executed by the CPU 100. Reference numeral 102 denotes a RAM, which provides a memory for temporarily storing various types of information when the CPU 100 executes a program. Reference numeral 103 denotes a hard disk, which is a storage medium for saving image files, pattern identification parameters, and so on. Reference numeral 104 denotes a display, which is an apparatus that provides processing results of the present embodiment to the user. Reference numeral 110 denotes a control bus/data bus, which connects the above-described units to the CPU 100.

The flow of a process for detecting a face that is executed by the information processing apparatus configured as above will be described with reference to the flowchart of FIG. 2. First, in step S201, the CPU 100 loads image data from the hard disk 103 into the RAM 102. The image data is stored in the RAM 102 as a two-dimensional array. In the next step, step S202, the CPU 100 loads a pattern identification parameter created by a learning method described later from the hard disk 103 into the RAM 102. In step S203, the CPU 100 determines whether or not a face is included in an image represented by the image data that has been loaded in step S201 using the pattern identification parameter that has been loaded in step S202. In the next step, step S204, the CPU 100 displays the result of the face detection performed in step S203 on the display 104.

Figure 2:
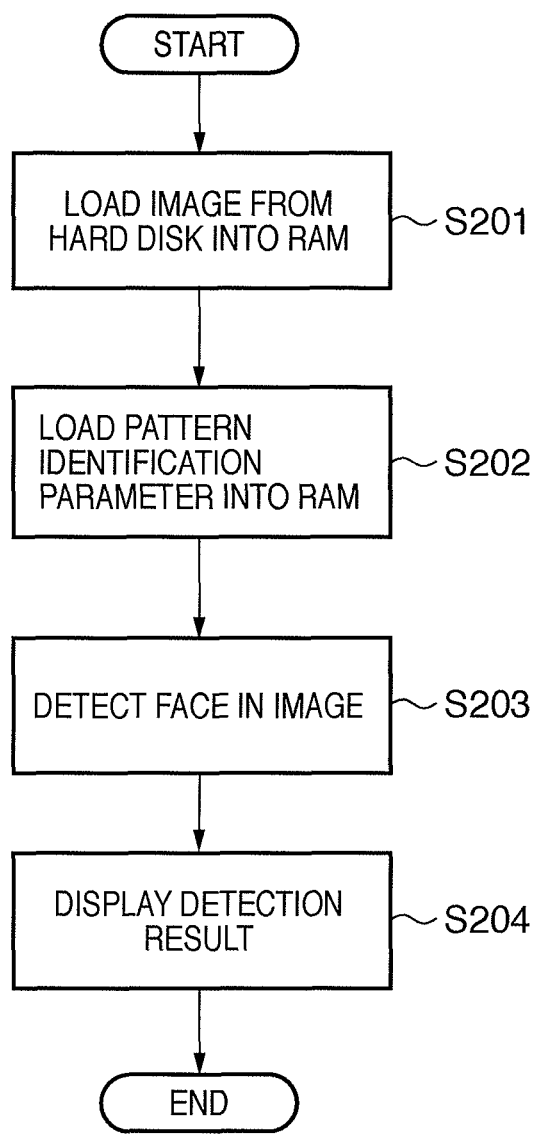
FIG. 2 is a flowchart illustrating the flow of a face detection process according to Embodiment 1.
Figure 3:
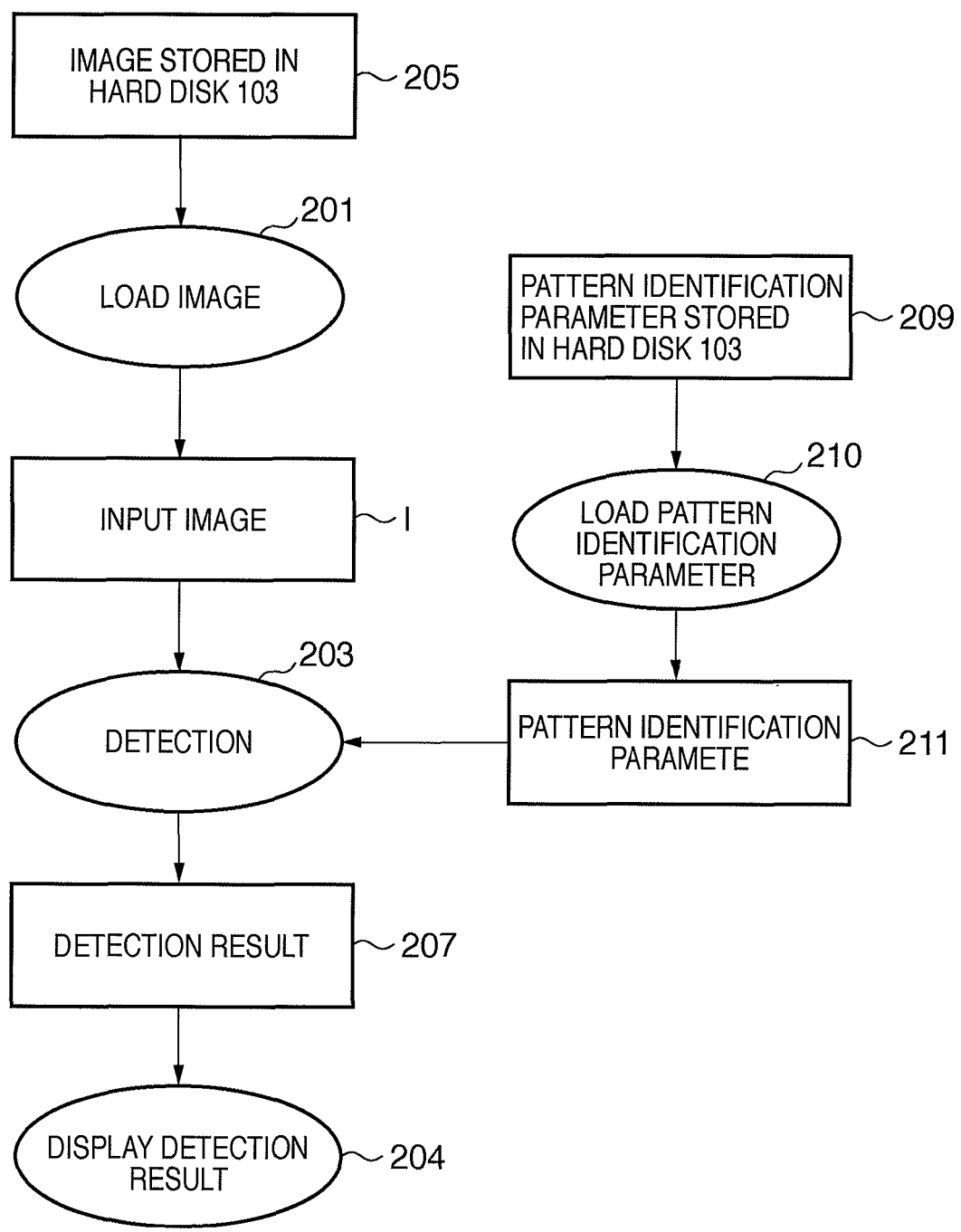
FIG. 3 is a diagram illustrating the face detection process shown in FIG. 2 in the form of a data flow diagram.

The processing of FIG. 2 presented in the form of a data flow diagram is shown in FIG. 3. An image 205 corresponds to image data that is saved in the hard disk 103. Through an image loading process 201, the image 205 saved in the hard disk 103 is stored as an input image I in the RAM 102 (step S201). In the hard disk 103, a pattern identification parameter 209 is saved. In a pattern identification parameter loading process 210, the pattern identification parameter 209 saved in the hard disk 103 is loaded, and stored in the RAM 102 as a pattern identification parameter 211 (step S202). In a detection process 203, it is determined whether or not a face is included in the input image I using the input image I and the pattern identification parameter 211, and the determination result is written into the RAM 102 as a detection result 207 (step S203). In a detection result display process 204, the content of the detection result 207 is displayed on the display 104 (step S204).

Figure 4:
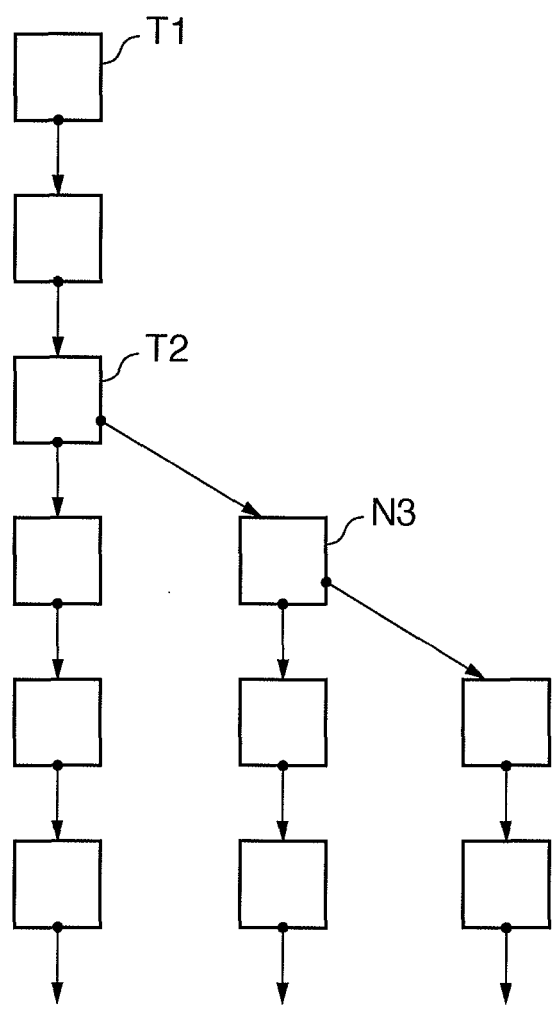
FIG. 4 is a diagram illustrating the structure of a pattern identification parameter according to Embodiment 1.

The content of the pattern identification parameter 211 will now be described with reference to FIGS. 4 and 5. A method for creating the pattern identification parameter 211 will be described later. As shown in FIG. 4, data indicative of the pattern identification parameter 211 has a structure in which two types of nodes represented by T1 and T2 are connected in a tree structure. Type-T1 node is connected only to a single node. Type-T2 node is connected to a plurality of nodes. A node represented by N3 belongs to the Type-T2 node. As described above, the pattern identification process according to the present embodiment classifies input data into either a first class (e.g., an image including no face) or a second class (e.g., an image including a face) by sequentially executing a plurality of nodes, that is, a combination of a plurality of classification processes. The present embodiment can be applied regardless of the type of Type T1, and thus a detailed description of Type-T1 node is omitted here. As Type-T1 node, for example, a weak classifier as described in Document 1 may be used in which if inputted data is determined to be classified as the first class, the processing is terminated, and if inputted data is determined to be classified as the second class, the processing advances to the next node.

FIG. 5 shows a data structure of Type-T2 node. A plurality of this data is stored in the memory represented by the RAM 102 in FIG. 1. Ordinarily, the data of respective nodes have different values. Node type is stored on the top. In this case, the node is of Type T2, a sign that represents T2 is stored as the node type. Rectangle information is stored next. In the head of the rectangle information, the number of rectangles n (where n is an integer equal to or greater than 2) is stored, followed by coordinates (the upper left point, the lower right point) of the n rectangles. Thereby, the position and size of the n rectangles are defined. These plural rectangles are collectively referred to as a "rectangles group". A parameter for censoring, which will be described later, is stored next. In the head of the censoring parameter, the threshold value θ is stored. Then, censoring coefficients that respectively correspond to the n rectangles follow. Then, the number of branch targets m and branch parameters corresponding to a number equal to m−1 follow. In each branch parameter, similar to the censoring parameter, its threshold value and coefficients that correspond to the number of rectangles are stored, and in addition thereto, a pointer that leads to a branch target node is also stored. In the node pointed by this pointer, the parameter of another node is stored. In the end, another pointer that leads to the mth branch target node (a pointer that leads to the last branch target node) is stored.

Figure 6A:
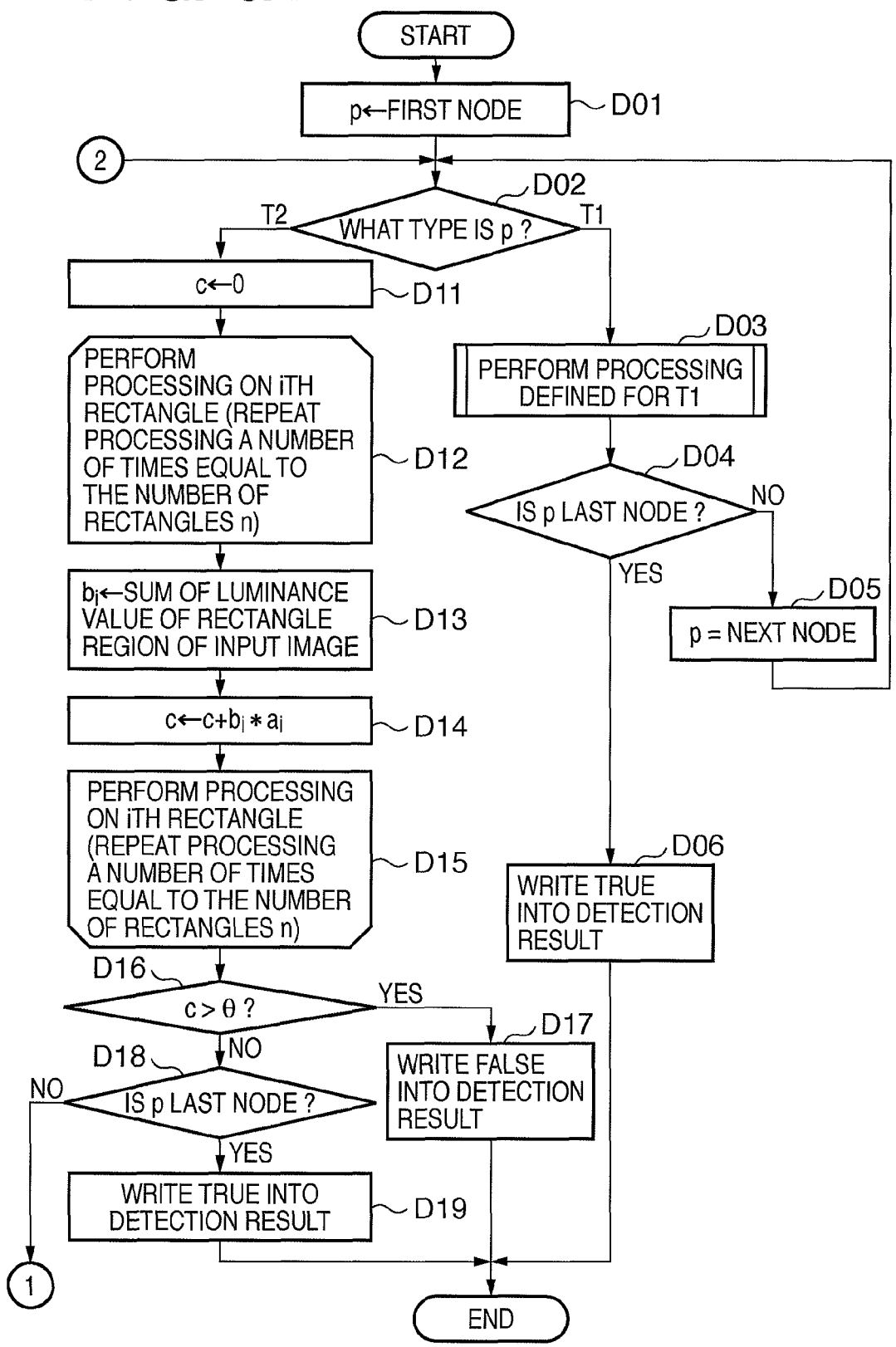
FIGS. 6A and 6B are a flowchart illustrating step S203 of FIG. 2 in detail.
Figure 6B:
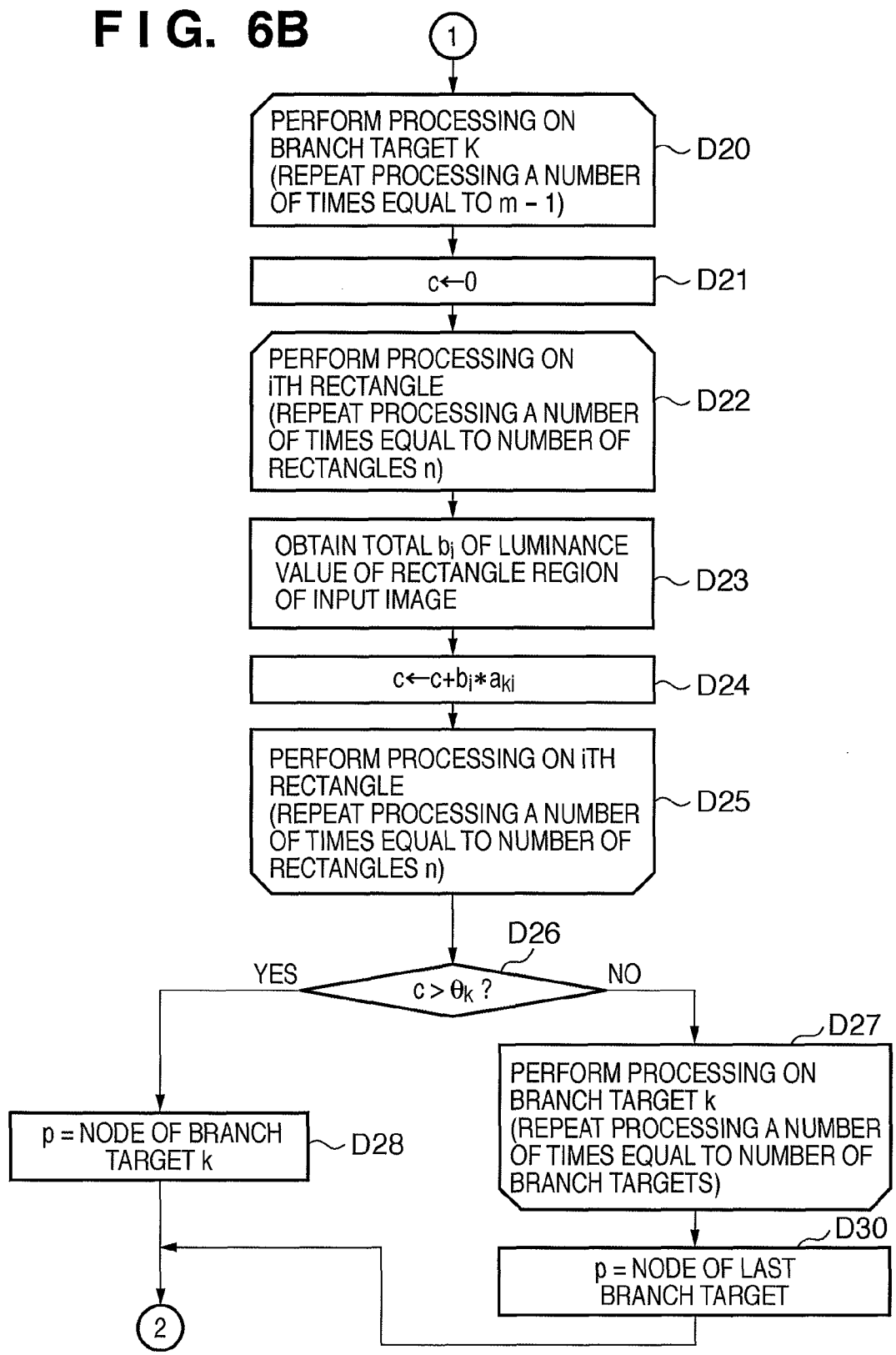

Before describing a method for creating the parameter (learning method), a method for detecting a face using this parameter is described. FIGS. 6A and 6B are a flowchart illustrating step S203 (a process for detecting a face in an image) of FIG. 2 in detail. First, in step D01, the CPU 100 initializes a pointer variable p such that it indicates the first node. In the next step, step D02, the type of the node indicated by p is checked. If the node indicated by p is of Type T1, the processing advances to step D03. If the node indicated by p is of Type T2, the processing advances to step D11. In step D03, processing is performed on Type T1 node, but this processing is well known, and thus its detailed description is omitted here. After the processing of step D03 is finished, in step D04, the CPU 100 checks whether or not all of the nodes have been processed. If all of the nodes have been processed, the processing advances to step D06, where the CPU 100 writes a value of TRUE into the detection result 207. This indicates that a face has been detected. If all of the nodes have not been processed yet, in step D05, the CPU 100 changes the pointer variable p such that it indicates the next node. Then, the processing returns to step D02.

On the other hand, if the node indicated by p is of Type T2, in step D11, the CPU 100 initializes a variable c to 0. Then, a loop ranging from step D12 to step D15 is repeated n times that correspond to the number of rectangles. A loop variable that represents a rectangle in the loop is set to i. In step D13, the CPU 100 obtains coordinates $(X_{1L}, Y_{1T})$, $(X_{iR}, y_{iB})$ of a diagonal line of the rectangle i from the node information of FIG. 5. Then, a rectangle image that corresponds to the rectangle i is extracted from the input image I, and the sum (total value) of the luminance value of the rectangle image is determined. The sum of the luminance value of the ith rectangle image is set to $b_i$. $b_i$ can be determined quickly using an integral image as described in Document 1. In step D14, the CPU 100 adds, to the variable c, a product obtained by multiplying $b_i$ by a coefficient $a_i$ of the rectangle i. In short, what is determined in the loop ranging from step D12 to step D15 is the following inner product.

$$c = \sum_i b_i a_i \qquad \text{[Formula 1]}$$

In step D16, the CPU 100 determines whether or not the inner product c is above the threshold value θ of the censoring parameter of FIG. 5. If the inner product c is above the threshold value θ, the processing advances to step D17, where the CPU 100 writes a value of FALSE into the detection result 207. This indicates that no face has been detected, that is, the input image I has been classified as the second class. Accordingly, the processing of the tree structure shown in FIG. 4 is terminated here. If it is determined in step D16 that the inner product c is not above the threshold value θ, the processing advances to step D18 to select a node to be used next.

To put it differently, the above processing includes: where the number of rectangles registered in the parameter is n, mapping the feature amount (the sum of luminance value) of each of n partial data items (rectangles) obtained from input data (an input image I) as corresponding points having coordinates $(b_1, b_2, \ldots b_n)$ in an n-dimensional feature space, and determining whether the input image I belongs to a first class for non-face images (the process should be discontinued) or the classification process of the next node is executed based on the coordinate location of the mapped corresponding points in the n-dimensional feature space by applying, for example, a discrimination function (calculation of an inner product) to the coordinate value of the corresponding points.

If it is determined in step D16 described above that the next classification process (node) should be executed, a classification process (node) to be executed next is selected based on the location of the corresponding point as will be described below.

First, in step D18, the CPU 100 checks whether or not all of the nodes have been processed. If all of the nodes have been processed, the processing advances to step D19, where the CPU 100 writes a value of TRUE into the detection result 207. This indicates that a face has been detected, that is, the input image I has been classified as the first class.

On the other hand, if it is determined in step D18 that all of the nodes have not been processed yet, a loop that starts from step D20 is executed. The loop ranging from step D20 to step D27 is repeated m−1 times at the maximum. Here, m is the number of branch targets m of FIG. 5. A variable that represents a branch target in the loop ranging from step D20 to step D27 is set to k. In step D21 of the loop, the CPU 100 initializes the variable c to 0. Then, the following inner product is determined in a loop ranging from step D22 to step D25, as the loop of step D12 to step D15.

$$c = \sum_i b_i a_{ki} \quad \text{[Formula 2]}$$

In this formula, as the value of $b_i$, a value determined for $b_i$ of Formula 1 above can be used again. In step D26, it is checked whether or not the inner product c is above a threshold value $\theta_k$. If the inner product c is not above the threshold value $\theta_k$, the loop ranging from step D20 to step D27 continues to be executed. If the inner product c is above the threshold value $\theta_k$, the processing advances to step D28. In step D28, the CPU 100 assigns a pointer value that leads to the branch target k to the pointer variable p. Then, processing that starts from step D02 is started again for the node of the branch target k. If it is determined in step D26 that the inner product c is not above the threshold value $\theta_k$ and the loop that ends in step D27 is finished, the processing advances to step D30. In step D30, the CPU 100 assigns a pointer value that leads to the last branch target node of FIG. 5 to the pointer variable p. Then, the processing that starts from step D02 is started again. Through the above-described processing, the nodes of the tree structure shown in FIG. 4 are processed one after another.

A learning procedure for creating the pattern identification parameter used in FIGS. 4 and 5 will be described. First, it is assumed that a set of learning face images $f_j$: $F=\{f_j|j=1\ldots N_f\}$ and a set of learning non-face images $g_j$: $G=\{g_j|j=1\ldots N_g\}$ are prepared. It is also assumed that a set of rectangles groups $\phi_s$ as indicated by the rectangle information of FIG. 5: $\Phi=\{\phi_s|s=1\ldots N_\phi\}$ is prepared in advance. It is further assumed that the tree structure of FIG. 4 is determined in advance, and a memory region for storing parameters is already allocated in the RAM 102. At this time, each pointer value of FIG. 5 is already determined, and therefore they can be stored. Here, it is assumed that nodes from the node represented by T1 to a node preceding the node represented by N3 (i.e., the node indicated by T2) of FIG. 4 have already been learned. To learn Type-T1 node, a technique as described in Document 1 can be used.

With the application of the above-described detection process, some of the learning images are rejected (censored) as non-face images through the nodes that precede N3, or are sent to another branch target by the Type-T2 node. In the node N3, a set of face images $f_j^+$ that were not rejected through the nodes preceding N3 or were not sent to another branch target: $F^+=\{f_j^+|j=1\ldots N_f^+\}$ and a set of non-face images $g_j^+$: $G^+=\{g_j^+|j=1\ldots N_g^+\}$ are used for learning. As used herein, "face image" refers to an image in which there is a human face, and "non-face image" refers to an image in which there is no human face.

Figure 7:
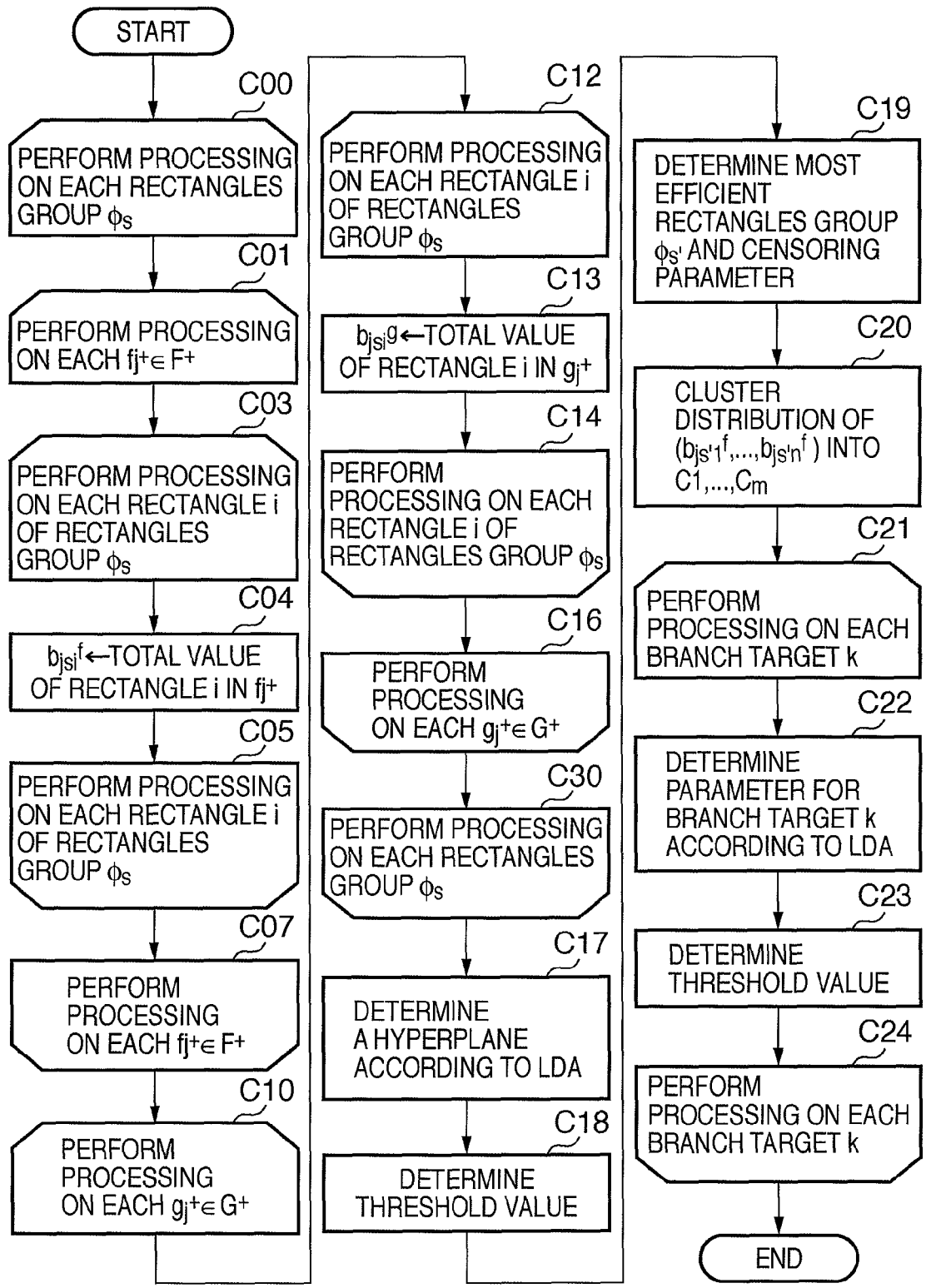
FIG. 7 is a flowchart illustrating a learning procedure according to Embodiment 1.

A flowchart illustrating the learning procedure is shown in FIG. 7. The processing of the loop ranging from step C00 to step C30 is repeated for each of the rectangles groups $\phi_s$ ($s=1\ldots N_\phi$) that belong to $\Phi$. The loop ranging from step C01 to step C07 is a process for face images $f_j^+$ that belong to $F^+$. The loop ranging from step C03 to step C05 is repeated for each rectangle i on a rectangles group $\phi_s$. In step C04, the CPU 100 assigns the total luminance value of the pixels in a rectangle i of a face image $f_j^+$ to an element $b_{jsi}^f$ in a three-dimensional array. In the present embodiment, the total luminance value is used as an example of the feature amount of a rectangle, but other feature amount may be used. The loop ranging from step C10 to step C16 is a process for non-face images $g_j^+$ that belong to $G_j^+$. Similarly, as in the loop ranging from step C01 to step 07, the CPU 100 assigns the total luminance value of the pixels in a rectangle i of a non-face image $g_j^+$ to an element $b_{jsi}^g$ in the three-dimensional array. Through the above processing, the distribution of the corresponding points $(b_{js1}^f, \ldots, b_{jsn}^f)$ and $(b_{js1}^g, \ldots, b_{jsn}^g)$ for the respective face images $f_i^+$ and the respective non-face images $g_j^+$ in an n-dimensional space can be obtained. In other words, for the non-face images $g_j^+$ serving as learning data labeled as the first class and the face images $f_i^+$ serving as learning data labeled as the second class, the corresponding points are mapped in an n-dimensional feature space ($n=N_o$).

In step C17, the CPU 100 applies LDA, as a linear discrimination function, to the distribution of these two classes (the result obtained by mapping corresponding points) to obtain a hyperplane for separating the two classes in the n-dimensional space. As used herein, LDA is an abbreviation of linear discriminant analysis. The normal vector of this hyperplane is expressed as $(a_1^s, \ldots, a_n^s)$. In step C18, the CPU 100 determines a threshold value $\theta^s$. The threshold value $\theta^s$ can be determined by finding a value at which the total number of failures is the minimum after learning images are classified by finely setting a threshold value and comparing the threshold value to $\Sigma a_i b_i$. As used herein, "the total number of failures" is the sum of "the total number of face images that have been classifies as non-face images" and "the total number of non-face images that have been classified as face images". Alternatively, the threshold value $\theta^s$ may be determined such that the total number of non-face images that have been classified as face images is the minimum in a threshold value close to a predetermined ratio at which face images that have been classified as non-face images.

In step C19, the CPU 100 selects an s at which the total number of failures is the smallest from among the threshold values $\theta^s$ determined for respective rectangles groups $\phi_s$, and sets it as s'. Alternatively, it is possible to select an s at which the total number of non-face images that have been classified as face images is the smallest. The corresponding point $(a_1^{s'}, \ldots, a_n^{s'})$ that corresponds to this s' and its threshold value $\theta^{s'}$ are set as the censoring parameter $(a_1, \ldots, a_n)$ and the threshold value $\theta$ of FIG. 5, respectively. In this way, a pattern identification parameter that divides a feature space in which the corresponding points labeled as the same class occupy, in an n-dimensional feature space is learned. Here, it is assumed that a space that satisfies the following formula corresponds to $F^+$, and a space that does not satisfy the following formula corresponds to $G^+$.

$$\theta < \sum_i a_i b_i \quad \text{[Formula 3]}$$

In the formula, $b_i$ is the coordinate value of the ith corresponding point. If the above relationship cannot be obtained, the direction of the normal vector may be reversed.

In step C20, the CPU 100 divides the distribution of the corresponding points $(b_{js1}^f, \ldots, b_{jsn}^f)$ of face images obtained through the processing up to this point into m clusters by clustering. In other words, corresponding points labeled as the same class are separated into a plurality of clusters. m is a value that is determined in advance for the node N3. A single cluster corresponds to a single branch target. As the clustering method, the k-means or the like can be used. As a result of clustering, all of the face images $f_i^+$ are associated with any one of clusters $C_1, \ldots, C_m$. A loop ranging from step C21 to step C24 is repeated for each branch target k. k is incremented by 1 after each loop. In step C22 of the loop, the corresponding points that correspond to face images that belong to two classes: $C_k$ and $C_{k|1} \cup \ldots \cup C_m$ are separated with a hyperplane according to LDA. Then, the normal vector of the hyperplane thus obtained is stored as $(a_{k1}, \ldots, a_{kn})$ in the corresponding region of FIG. 5. Subsequently, in step C23, for example, a threshold value $\theta_k$ at which the total number of failures is the minimum is determined. Here, it is assumed that a space that satisfies the following formula corresponds to $C_k$, and a space that does not satisfy the following formula corresponds to $C_{k+1} \cup \ldots \cup C_m$. In this way, in steps C21 to C24, a pattern identification parameter that further separates the corresponding points of learning data labeled as the same class into a plurality of clusters is learned (separation parameter learning), and is used as a parameter for a branch target in FIG. 5.

$$\theta_k < \sum_i a_{ki} b_i \qquad \text{[Formula 4]}$$

Otherwise, the direction of the normal vector may be reversed.

As described above, according to Embodiment 1, a face included in an input image can be detected through a process of a relatively small calculation load. In the present embodiment, a face is used as a specific example, but the present embodiment can be utilized to detect other objects such as a head or an automobile. In a detector as described in Document 1 in which weak classifiers are cascade-connected, it is known to be important to censor more non-face images at an early stage. In light of this, in the present embodiment, even when a branch structure is adopted, a rectangles group that is intended to be censored is selected, and this is used for branching. Thereby, high-speed and highly accurate pattern identification is achieved.

Embodiment 2

Embodiment 2 illustrates an example of an information processing apparatus that detects an object having a specific texture from an inputted image. Unlike Embodiment 1, in Embodiment 2, an object to be detected may not be located in a predetermined location of an input image. Furthermore, in Embodiment 1, a set of rectangles groups needs to be determined in advance, whereas in Embodiment 2, rectangles groups that are used by respective nodes for identification processing are automatically generated by preparing only rectangles that serve as candidates for elements, and setting the number of rectangles included in a single rectangles group. For the sake of simplicity, Embodiment 2 describes a binary tree, but it is easily conceivable from Embodiment 1 that the present embodiment can be applied to a multiway tree.

The information processing apparatus according to Embodiment 2 has the same hardware configuration as that of Embodiment 1 (FIG. 1). Accordingly, reference should be made to Embodiment 1 for a description of each unit.

Figure 8:
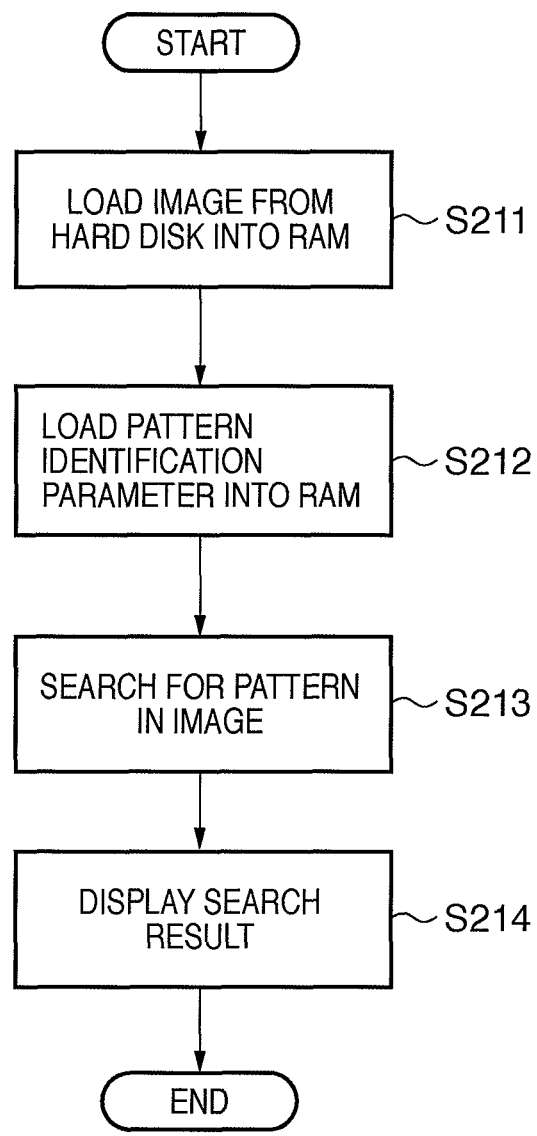
FIG. 8 is a flowchart illustrating the flow of a texture detection process according to Embodiment 2.

A flowchart illustrating the flow of a process for detecting a texture is shown in FIG. 8. First, in step S211, the CPU 100 loads an image from the hard disk 103 into the RAM 102. The image is stored in the RAM 102 as a two-dimensional array. In step S212, the CPU 100 loads a pattern identification parameter created by a learning method described later from the hard disk 103 into the RAM 102. In step S213, the CPU 100 searches an image that has been loaded in step S211 for a region in which a predetermined texture is present using the pattern identification parameter that has been loaded in the previous step. In step S214, the CPU 100 displays the result of the search on the display 104.

Figure 9:
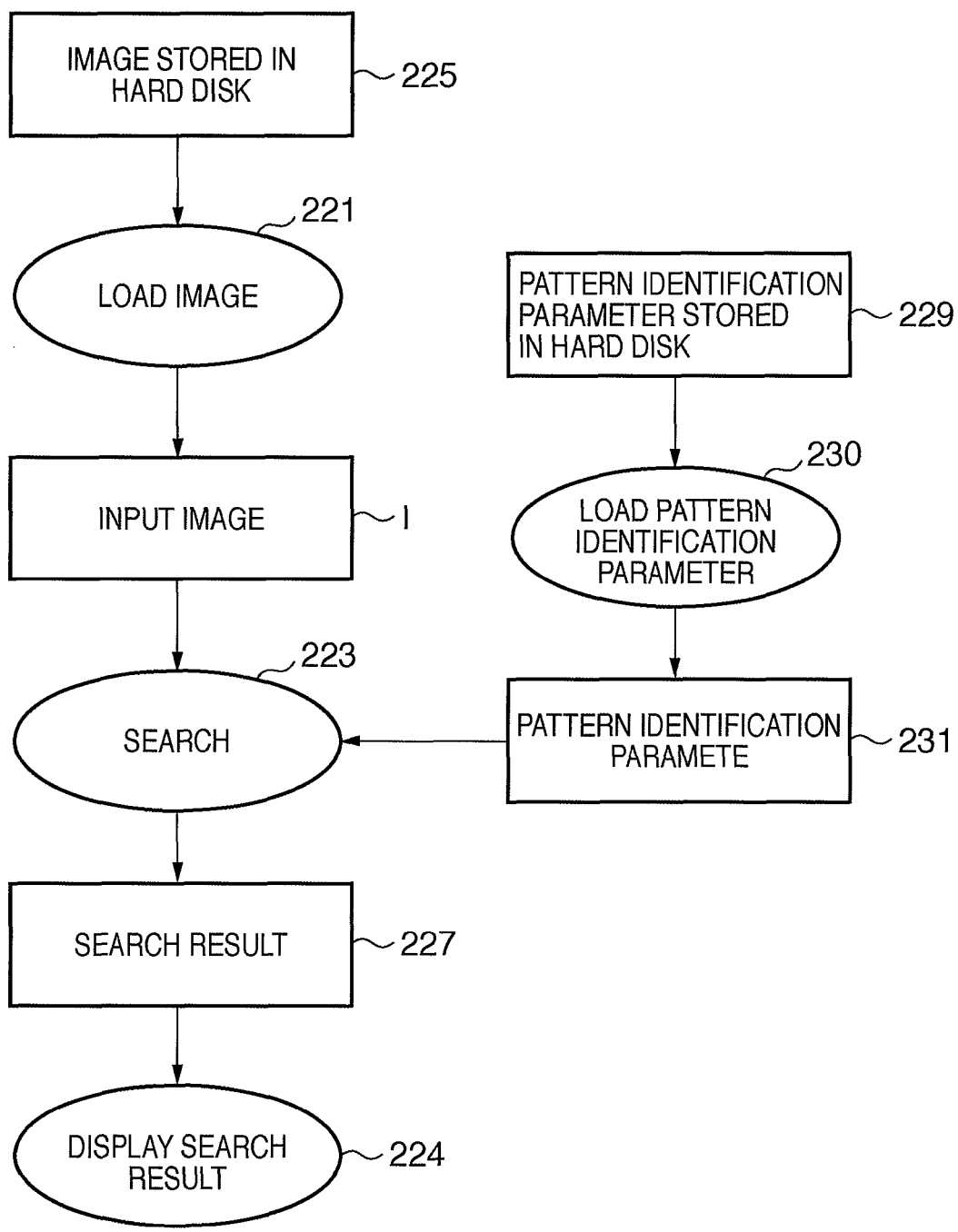
FIG. 9 is a diagram illustrating the texture detection process shown in FIG. 8 in the form of a data flow diagram.

The processing of FIG. 8 presented in the form of a data flow diagram is shown in FIG. 9. Reference numeral 225 denotes an image that is saved in the hard disk 103 of FIG. 1. In an image loading process 221, the image 225 saved in the hard disk is stored as an input image I in the RAM 102 (step S211). Reference numeral 229 denotes a pattern identification parameter that is saved in the hard disk 103. In pattern identification parameter loading process 230, the pattern identification parameter 229 saved in the hard disk is stored in the RAM 102 as a pattern identification parameter 231 (step S212). In a search process 223, with the use of the input image I and the pattern identification parameter 231, a search is performed in the input image I for a predetermined texture, and a location in which the predetermined texture is found is written into the RAM 102 as a search result 227 (step S213). In the present embodiment, a region in which a predetermined texture is not included is classified as a first class, and a region in which a predetermined texture is included is classified as a second class. The search result 227 is a two-dimensional array of black and white values. In a search result display process 224, the content of the search result 227 is displayed on the display 104 (step S214).

Figure 10:
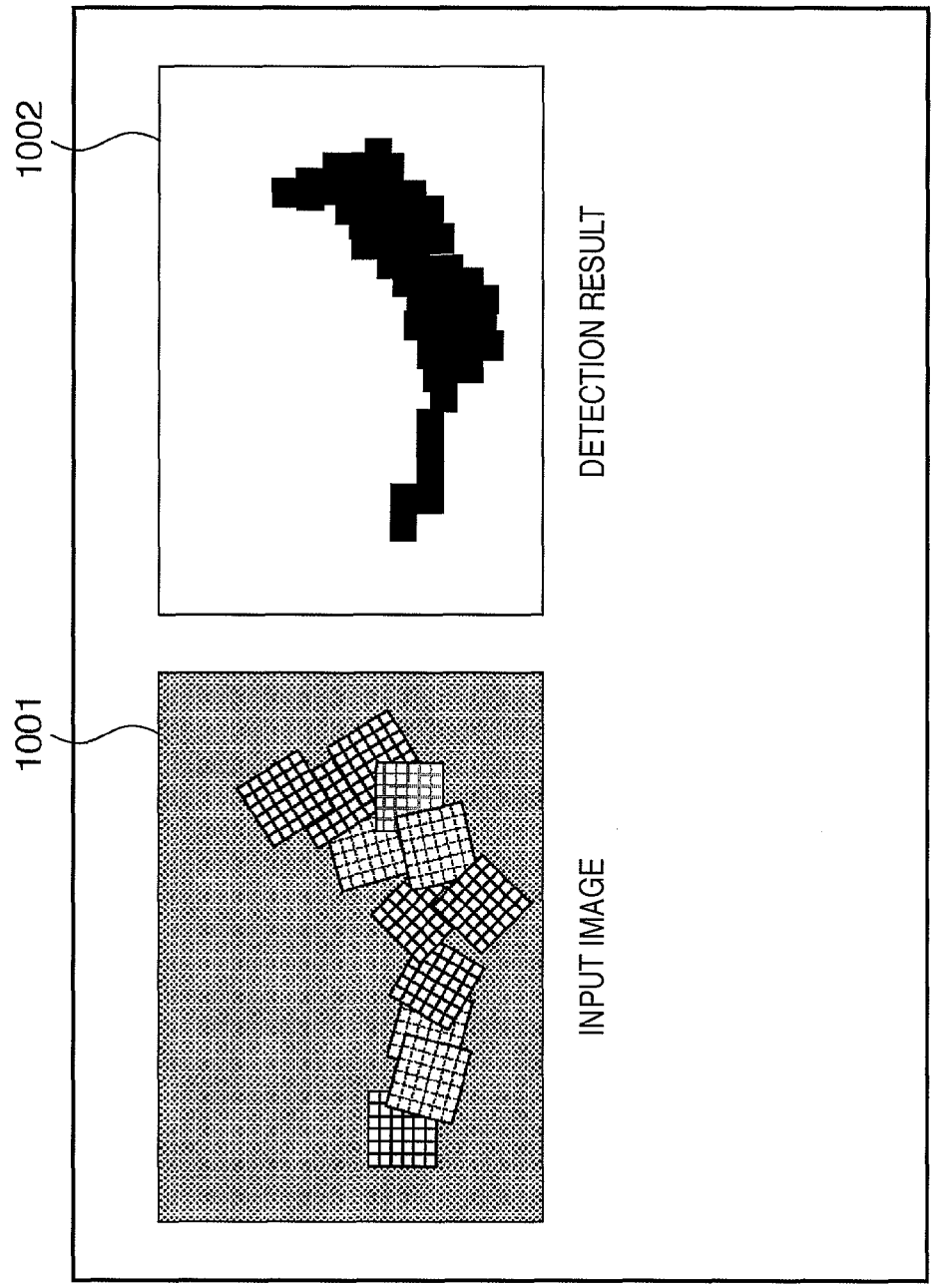
FIG. 10 is a diagram illustrating an example in which a result of the texture detection process according to Embodiment 2 is displayed on a display.

FIG. 10 shows an example of information displayed on the display 104. This is merely a schematic diagram for illustrating the operation of Embodiment 2, and the present embodiment does not necessarily provide the result shown in FIG. 10. In a region 1001 on the left, the content of the input image I is displayed. In a region 1002 on the right, the content of the search result 227 is displayed. In the search result shown in the region 1002, a region in which the grid patterns of the input image are present is shown in black.

Figure 11:
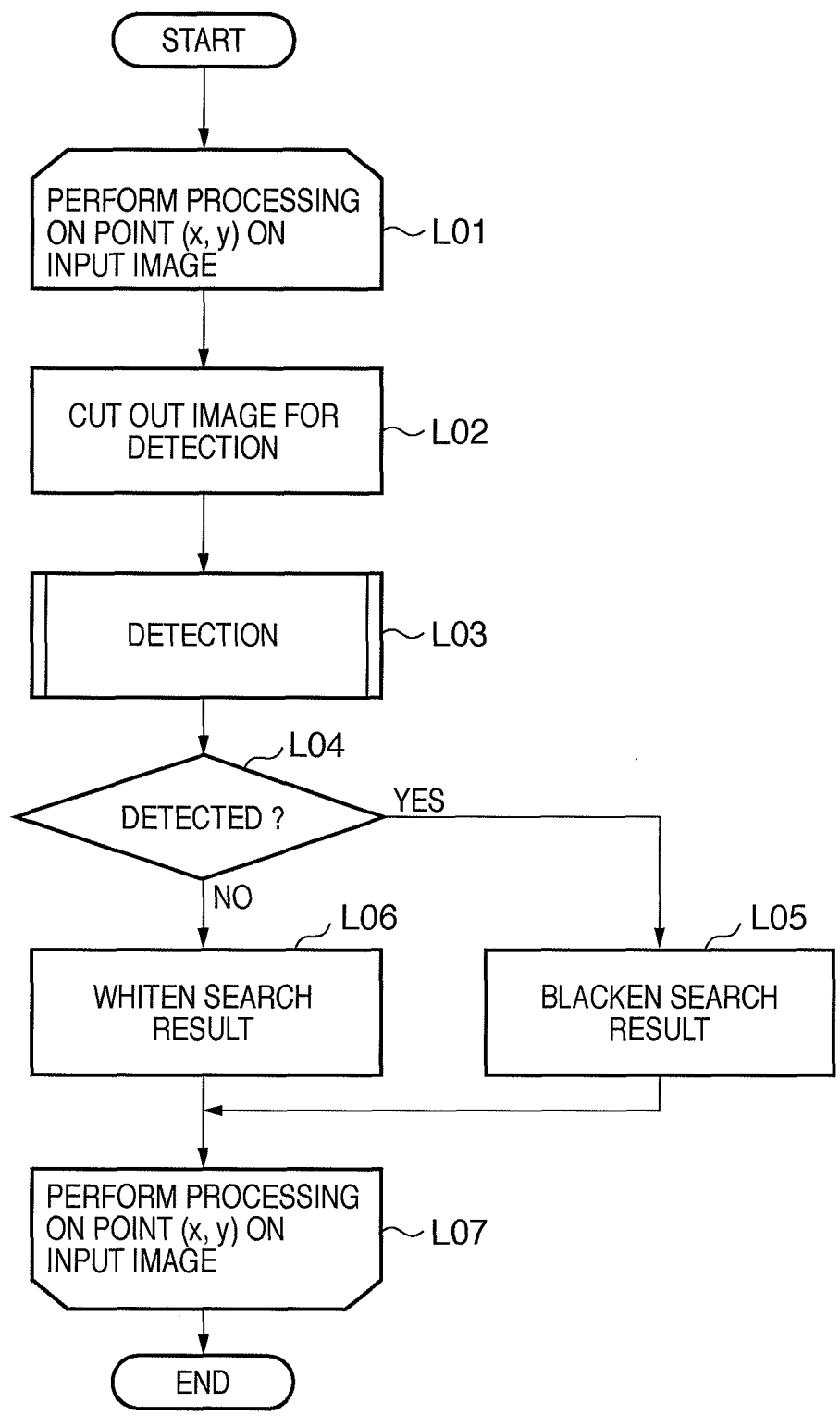
FIG. 11 is a flowchart illustrating the content of step S213 of FIG. 8.

FIG. 11 is a flowchart illustrating the content of step S213 (a process for searching a pattern in an image) of FIG. 8. In a loop ranging from step L01 to step L07, the processing shown in steps L02 to L06 is repeated for each point (x, y) on the input image I. In step L02, the CPU 100 cuts out a region near the point (x, y), which serves as a target pixel on the input image I, as an image R for detection. The size of the image R is the same as that of a learning image described later. Step L03 is a detection process. This detection process is the same as that shown in FIGS. 6A and 6B of Embodiment 1, except that the detection process is performed for the cut-out image R, instead of the input image I. Subsequently, in step L04, the CPU 100 determines whether the detection result obtained in step L03 is TRUE or FALSE (i.e., whether it is classified into the second class or the first class). If the result is determined to be TRUE, the processing advances to step L05, where the CPU 100 writes BLACK into the (x, y) component (a target pixel) of the search result 227. Conversely, if the result is determined to be FALSE in step L04, the processing advances to step L06, where the CPU 100 writes WHITE into the (x, y) component (a target pixel) of the search result 227. In this way, images into which WHITE or BLACK is written are obtained as the search result 227.

A learning procedure according to Embodiment 2 will be described next. The content of the pattern identification parameter 231 according to Embodiment 2 has the same structure as those shown in FIGS. 4 and 5 of Embodiment 1. Examples of images that are used for learning are shown in FIG. 12. All of the images used for learning have the same size. These images represent patterns that need to be detected. In contrast, as a pattern that needs not to be detected, an image obtained by cutting out from the background of the input image shown in the region 1001 of FIG. 10 is used.

A learning image that includes a pattern that needs to be detected is denoted as $p_j$, and a set thereof is expressed as $P=\{p_j|j=1,\ldots,N_p\}$. Likewise, a learning image that does not include a pattern that needs to be detected is denoted as $q_j$, and a set thereof is expressed as $Q=\{q_j|j=1,\ldots,N_q\}$. Furthermore, a rectangles that is represented by rectangle coordinates $(x_{iL}, y_{iT})$, $(x_{iB}, y_{iB})$ in FIG. 5 is denoted as $r_i$, and a set thereof is expressed as $R=\{r_i|i=1,\ldots,N_r\}$. It is assumed that the tree structure of FIG. 4 is determined in advance, and a memory for storing parameters is already allocated in the RAM 102. At this time, each pointer value of FIG. 5 is already determined, and therefore they can be stored. Here, it is also assumed that nodes from the node represented by T1 to a node preceding the node represented by N3 in FIG. 4 have already been learned.

With the application of the above-described detection process, some of the learning images are rejected (censored) as not including a pattern that needs to be detected through the nodes that precede N3, or are sent to another branch target by Type-T2 node. Accordingly, in Node N3, a set of pattern images $p_i^+$ that were not rejected or were not sent to another branch target through the preceding nodes: $P^+=\{P_j^+|j=1\ldots N_p^+\}$ and a set of non-pattern images $q_j^+$: $Q^+=\{q_j^+|j=1\ldots N_q^+\}$ are used for learning.

Figure 13:
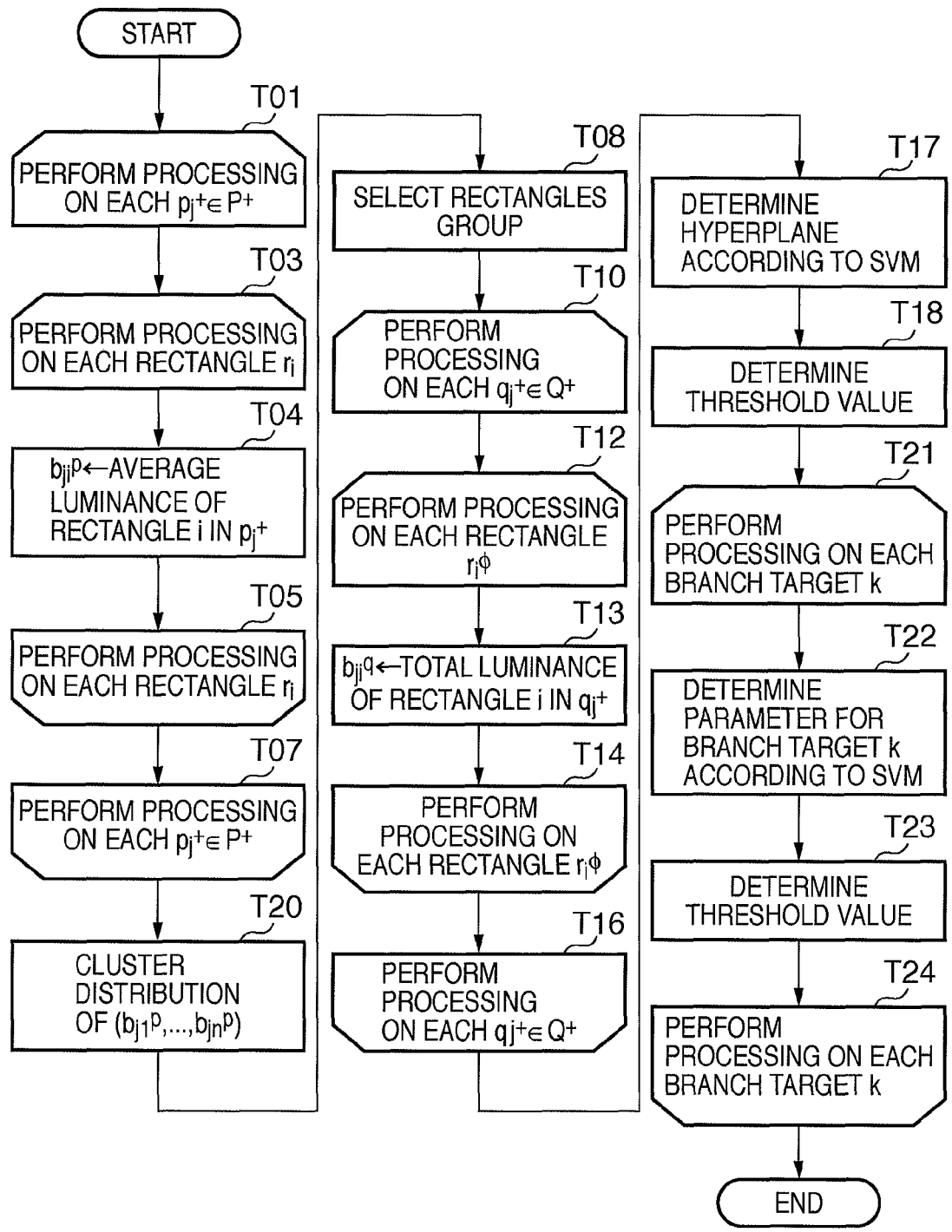
FIG. 13 is a flowchart illustrating a learning procedure according to Embodiment 2.

FIG. 13 shows a flowchart of learning according to Embodiment 2. The learning according to Embodiment 2 includes:

a first mapping process and a first learning process in which learning data is provisionally mapped using provisional rectangles groups to learn a parameter, and a rectangles group to be used is extracted; and a second mapping process and a second learning process in which learning data is mapped using the extracted rectangles group to learn a parameter.

Through the processing ranging from step T01 to step T08, a rectangles group that is presumed to be effective for determining a branch target is selected by the first mapping process and first learning process. Through the processing ranging from step T10 to step T18, a censoring parameter is determined by the second mapping process and second learning process. Through the last processing ranging from step T21 to step T24, a parameter for each branch target is determined. These steps will be described below one by one.

First, a loop ranging from step T01 to T07 is repeated for each pattern image $p_i^+$ of the set $P^+$. A loop ranging from step T03 to T05 in the above loop is repeated for each rectangle $r_i$ of the set R. In step T04 of the loop, the average luminance value of the rectangle $r_i$ of the pattern image $P_i^+$ is stored in an element $b_{ji}^P$ of a two-dimensional array. It should be noted here that, unlike Embodiment 1, the present embodiment employs a value (average luminance) obtained by normalizing the luminance value with the number of pixels. Thereby, a difference between pixel units can be absorbed. The mapping performed in the above processing is provisional mapping for selecting a rectangles group that is actually used. In other words, the processing from step T01 to T07 includes:

determining the feature amount (average luminance) by extracting $N_r$ rectangle images (where $N_r$ is an integer equal to or greater than 1) from image data that belongs to $P^+$ (learning data labeled as the first class); and provisionally mapping corresponding points in an $N_r$-dimensional feature space (first mapping).

Subsequently, in step T20, the CPU 100 clusters the distribution of $N_r$-dimensional vectors $(b_j^P, \ldots, b_{jN_r}^P)$ determined in the previous loop into a plurality of clusters. In other words, based on the distribution of the provisionally mapped corresponding points in the $N_r$-dimensional feature space, a provisional pattern identification parameter that divides the $N_r$-dimensional feature space is learned (first learning). Because a binary tree is generated in this example, the distribution is clustered into two (m=2). As the clustering method, the k-means can be used. Although it seems natural to use the Euclidean distance to determine the distance between vectors, it is also possible to use, for example, the Minkowski metric. Then, all of the pattern images in the set $P^+$ can be assigned to a cluster ($C_1$ or $C_2$), and thus a hyperplane that separates two clusters can be obtained with an SVM (support vector machine) or the like. The $N_r$-dimensional normal vector of that hyperplane is expressed as $(a_1^P, \ldots, a_{N_r}^P)$. It is assumed here that a natural number d and a real number u ($u \geqq 0$) are constants that are determined in advance for the node N3.

In step T08, the CPU 100 selects an absolute value in descending order of magnitude from among the elements of the normal vector obtained above, and stops selecting when the sum of the selected elements is equal to u or less and −u or more, or when the number of the selected elements reaches d. Then, a rectangle $\{r_i\}$ that corresponds to the selected element $\{a_i^P\}$ is selected. If n rectangles are selected in this manner, these can be expressed as a rectangle group: $\phi=\{r_i^\phi|i=1,\ldots,n\}$. As described above, in steps T20 and T08, an n-dimensional feature space that is used by nodes for identification processing is determined using a provisional parameter obtained based on provisional mapping.

Subsequently, a loop ranging from step T10 to T16 is repeated for each non-pattern image $q_j^+$ of the set $Q^+$. A loop ranging from step T12 to T14 in the above loop is repeated for each rectangle $r_i^\phi$ of the previously selected rectangles group $\phi$. In step T13, the total luminance value of the rectangle $r_i^\phi$ on the non-pattern image $q_j^+$ is assigned to the element $b_{ji}^q$ of the two dimensional array. In other words, the processing ranging from step T10 to step T16 is a process for mapping image data that belongs to $Q^+$ (learning data labeled as the second class) as corresponding points in the n-dimensional feature space.

Then, in step T17, a hyperplane that separates the distribution of $(b_{j1}^P, \ldots, b_{jn}^P)$ from the distribution of $(b_{j1}^q, \ldots, b_{jn}^q)$ is calculated. The normal vector of the hyperplane thus obtained is stored as $(a_1, \ldots, a_n)$ in the corresponding region (censoring parameter) of FIG. 5. In other words, a pattern identification parameter that divides the n-dimensional feature space is learned based on the distribution of the mapped corresponding points in the n-dimensional feature space, and is stored as a censoring parameter (second learning). In step T18, as in the case of Embodiment 1, a threshold value θ for censoring parameter is determined. As described above, according to steps T10 to T18, non-pattern images $q_j^+$ as learning data labeled as the second class are mapped as corresponding points on the n-dimensional feature space. In this way, a pattern identification parameter that divides the n-dimensional feature space is learned based on the distribution of the mapped corresponding points.

The processing ranging from step T21 to step T24 is the same as that ranging from step C21 to C24 of FIG. 7 in the Embodiment 1, except that SVM is used instead of LDA for acquiring a hyperplane that separates clusters. The number of clusters in clustering is 2 (m=2).

As described above, according to the present embodiment, a predetermined pattern included in an input image can be searched through a process of a relatively small calculation load. Even if patterns appear the same to the human, when they have different inclinations, there is a large difference when the pixels are compared. According to the present embodiment, it is possible to absorb this difference by using unsupervised learning in which rectangles groups are not determined in advance and a branch-type detector.

Embodiments of the present invention have been described in detail above, but the present invention can take the form of a system, apparatus, method, program, storage medium and so on. Specifically, the present invention may be applied to a system configured of a plurality of devices or to an apparatus configured of a single device.

The present invention encompasses the case where the functions of the above-described embodiments are achieved by directly or remotely supplying a software program to a system or apparatus and loading and executing the supplied program code through a computer in the system or apparatus. In this case, the supplied program is a computer program that corresponds to the flowchart indicated in the drawings in the embodiments.

Accordingly, the program code itself, installed in a computer so as to realize the functional processing of the present invention through the computer, also realizes the present invention. In other words, the computer program itself that realizes the functional processing of the present invention also falls within the scope of the present invention.

In this case, a program executed through object code, an interpreter, script data supplied to an OS, or the like may be used, as long as it has the functions of the program.

Examples of the a computer readable storage medium that can be used to supply the computer program include floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Alternatively, using a browser of a client computer to connect to an Internet website and downloading the computer program of the present invention from the website to a recording medium such as a hard disk can be given as another method for supplying the program. In this case, the downloaded program may be a compressed file that contains an automatic installation function. Furthermore, it is also possible to divide the program code that constitutes the program of the present invention into a plurality of files and download each file from different websites. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has satisfied predetermined conditions is allowed to download key information for decryption from a website through the Internet, execute the encrypted program using the key information, and install the program on a computer.

Also, the functions of the present embodiments may be realized, in addition to through the execution of a loaded program using a computer, through cooperation with an OS or the like running on the computer based on instructions of the program. In this case, the OS or the like performs part or all of the actual processing, and the functions of the above-described embodiments are realized by that processing.

Furthermore, a program loaded from the storage medium is written into a memory provided in a function expansion board installed in a computer or in a function expansion unit connected to the computer, whereby part or all of the functions of the above-described embodiments may be realized. In this case, after the program has been written into the function expansion board or the function expansion unit, a CPU or the like included in the function expansion board or the function expansion unit performs part or all of the actual processing based on the instructions of the program.

According to the present invention, it is possible to realize pattern identification process for identifying input data that belongs to either of two classes with high speed and high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2007-252375, filed on Sep. 27, 2007, which is hereby incorporated by reference herein in its entirety.

What is claimed is:

1. A pattern identification method for classifying input image data into a first class in which image data does not include a specific object or a second class in which image data does include the specific object by sequentially executing a combination of a plurality of classification processes,
    wherein at least one of the plurality of classification processes comprises:
    a mapping step of mapping the input image data in an n-dimensional feature space as corresponding points representing respective feature amounts of n partial image data obtained from the input image data, where n is an integer equal to or greater than 2;
    a determination step of determining whether the input image data belongs to the first class or whether the next classification process should be executed for the input image data based on whether or not a first value related to a location of the corresponding points mapped in the n-dimensional feature space in the mapping step is larger than a censoring threshold value;
    a selecting step of selecting a classification process that should be executed next from a plurality of selectable classification processes so as to classify the input image data into a plurality of classifications, based on whether or not a second value related to the location of the corresponding points mapped in the n-dimensional feature space in the mapping step is larger than a branching threshold value in a case where it is determined that the next classification process should be executed for the input image data in the determination step, wherein the classification processes which are not selected are not executed; and
    a terminating step of terminating a processing for the input image data in a case where it is determined that the input image data belongs to the first class in the determination step.

2. The method according to claim 1,
    wherein the mapping step involves calculating a corresponding point in which a feature amount of each of n partial data items of the input image data serves as a coordinate value.

3. The method according to claim 2,
    wherein, in the determination step, the determination as to whether the input image data belongs to the first class or the next classification process should be executed is performed by applying a linear discrimination function to the location of the corresponding points.

4. The method according to claim 2,
    wherein the n partial data items are rectangle images that are extracted from the image data according to predetermined respective locations and size, and the feature amount is a total value or average value of luminance in each rectangle image.

5. The method according to claim 1, further comprising:
a cutout step of cutting out image data of a target pixel from an input image so as to use the cut-out image data as the input image data,
wherein each target pixel is determined to belong to either of the first or second class.

6. A non-transitory computer-readable storage medium that stores a program that causes a computer to execute the pattern identification method according to claim 1.

7. A pattern identification apparatus that classifies input image data into a first class in which image data does not include a specific object or a second class in which image data does include the specific object by sequentially executing a combination of a plurality of classification processes,
wherein at least one of the plurality of classification processes comprises:
a mapping step of mapping the input image data in an n-dimensional feature space as corresponding points representing respective feature amounts of n partial image data obtained from the input image data, where n is an integer equal to or greater than 2;
a determination step of determining whether the input image data belongs to the first class or whether the next classification process should be executed for the input image data based on whether or not a first value related to a location of the corresponding points mapped in the n-dimensional feature space in the mapping step is larger than a censoring threshold value;
a selecting step of selecting a classification process to be executed next from a plurality of selectable classification processes so as to classify the input image data into a plurality of classifications, based on whether or not a second value related to the location of the corresponding points mapped in the n-dimensional feature space in the mapping step-is larger than a branching threshold value in a case where it is determined that the next classification process should be executed for the input image data in the determination step, wherein the classification processes which are not selected are not executed; and
a terminating step of terminating a processing for the input image data in a case where it is determined that the input image data belongs to the first class in the determination step.

* * * * *